United States Patent
Ospalik et al.

(10) Patent No.: US 9,158,823 B2
(45) Date of Patent: Oct. 13, 2015

(54) USER INTERFACE MONITORING IN A MULTIMEDIA CONTENT DISTRIBUTION NETWORK

(75) Inventors: Kenneth W. Ospalik, Plainfield, IL (US); Marisa Earnshaw, Naugatuck, CT (US); John Mathew, Mount Prospect, IL (US); Giya Tektumanidze, Riverwoods, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 969 days.

(21) Appl. No.: 12/252,139

(22) Filed: Oct. 15, 2008

(65) Prior Publication Data

US 2010/0095218 A1  Apr. 15, 2010

(51) Int. Cl.
   *G06F 3/048* (2013.01)
   *G06F 17/30* (2006.01)
   *H04N 21/47* (2011.01)

(52) U.S. Cl.
   CPC .... *G06F 17/30539* (2013.01); *G06F 17/30029* (2013.01); *G06F 17/30058* (2013.01); *H04N 21/47* (2013.01)

(58) Field of Classification Search
   USPC .................. 715/745, 810, 811, 825
   See application file for complete search history.

(56) References Cited

U.S. PATENT DOCUMENTS

| | | | |
|---|---|---|---|
| 4,746,994 A | 5/1988 | Ettlinger | |
| 5,422,674 A | 6/1995 | Hooper et al. | |
| 5,493,638 A | 2/1996 | Hooper et al. | |
| 5,512,958 A | 4/1996 | Rzeszewski | |
| 5,648,781 A | 7/1997 | Choi | |
| 5,673,087 A | 9/1997 | Choi et al. | |
| 5,687,331 A | 11/1997 | Volk et al. | |
| 5,717,923 A * | 2/1998 | Dedrick | 1/1 |
| 5,850,352 A | 12/1998 | Moezzi et al. | |
| 5,861,994 A | 1/1999 | Kelly | |
| 6,004,243 A | 12/1999 | Ewert | |
| 6,008,777 A | 12/1999 | Yiu | |
| 6,067,190 A | 5/2000 | Kelly | |
| 6,142,913 A | 11/2000 | Ewert | |
| 6,637,029 B1 * | 10/2003 | Maissel et al. | 715/854 |
| 6,654,034 B1 | 11/2003 | Kanevsky et al. | |
| 7,013,478 B1 | 3/2006 | Hendricks et al. | |
| 7,112,138 B2 | 9/2006 | Hedrick et al. | |
| 7,657,493 B2 * | 2/2010 | Meijer et al. | 706/12 |
| 8,302,127 B2 * | 10/2012 | Klarfeld et al. | 725/46 |
| 8,805,816 B2 * | 8/2014 | Kimball et al. | 715/810 |
| 2001/0017632 A1 * | 8/2001 | Goren-Bar | 345/744 |
| 2002/0077880 A1 * | 6/2002 | Gordon et al. | 705/10 |
| 2002/0118954 A1 | 8/2002 | Barton et al. | |
| 2002/0158842 A1 | 10/2002 | Guy et al. | |
| 2003/0007092 A1 | 1/2003 | Sonner et al. | |
| 2003/0033612 A1 | 2/2003 | Schwalb | |
| 2003/0054881 A1 | 3/2003 | Hedrick et al. | |
| 2004/0085337 A1 | 5/2004 | Barrows | |
| 2004/0123329 A1 | 6/2004 | Williams et al. | |

(Continued)

*Primary Examiner* — Dino Kujundzic

(74) *Attorney, Agent, or Firm* — Jackson Walker L.L.P.

(57) ABSTRACT

A method for controlling a displayed user interface for accessing content provided by a multimedia content delivery network is disclosed. A plurality of user interface events, representing user actions during operation of the user interface, are recorded for one or more end users. The recorded user interface events include user actions that do not result in a command or transaction received by the service provider of the network. The recorded user interface events may be stored in a data warehouse and mined for business purposes.

21 Claims, 6 Drawing Sheets

(56) References Cited

U.S. PATENT DOCUMENTS

| | | |
|---|---|---|
| 2004/0137984 A1 | 7/2004 | Salter |
| 2004/0138943 A1 | 7/2004 | Silvernail |
| 2004/0139451 A1* | 7/2004 | Hope et al. .................... 719/318 |
| 2004/0195482 A1 | 10/2004 | Kollar et al. |
| 2005/0024331 A1 | 2/2005 | Berkley et al. |
| 2005/0114880 A1 | 5/2005 | Gould |
| 2006/0033707 A1 | 2/2006 | Rodomista et al. |
| 2006/0212886 A1 | 9/2006 | Porter |
| 2006/0230071 A1* | 10/2006 | Kass et al. ................. 707/104.1 |
| 2006/0252529 A1 | 11/2006 | Hedrick et al. |
| 2006/0266121 A1 | 11/2006 | Leybovich |
| 2007/0050294 A1 | 3/2007 | Trottier et al. |
| 2007/0089143 A1 | 4/2007 | Lefevre et al. |
| 2007/0136682 A1* | 6/2007 | Stienhans ..................... 715/789 |
| 2007/0174876 A1 | 7/2007 | Maggio et al. |
| 2007/0219856 A1 | 9/2007 | Ahmad-Taylor |
| 2008/0007420 A1 | 1/2008 | Meyers et al. |
| 2008/0051195 A1 | 2/2008 | Hedrick |
| 2008/0074837 A1 | 3/2008 | Denny et al. |
| 2009/0158166 A1* | 6/2009 | Dewar et al. .................. 715/745 |

\* cited by examiner

USER INTERFACE MONITORING IN A MULTIMEDIA CONTENT DISTRIBUTION NETWORK

BACKGROUND

1. Field of the Disclosure

The present disclosure relates to multimedia content delivery networks and, more particularly, user interfaces for accessing such networks.

2. Description of the Related Art

Subscribers to multimedia content delivery services frequently access content and other services by interacting with a user interface via a remote control device. Much of this interaction is not tracked or monitored by service providers, which have historically been primarily interested only in an end result of a typical interaction, namely a content selection or purchase.

DESCRIPTION OF THE EMBODIMENT(S)

Figure 1:
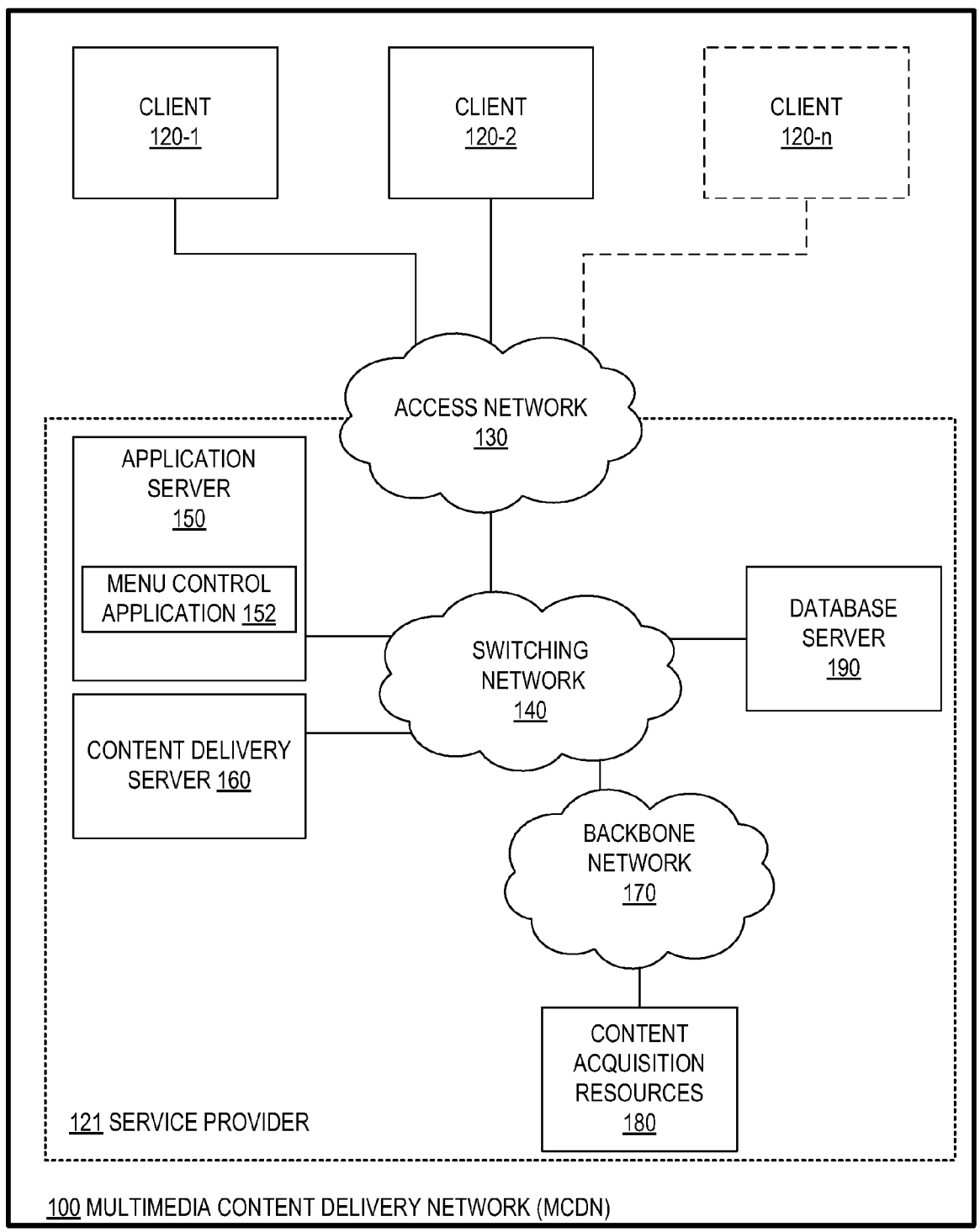
FIGS. 1 and 2 are block diagrams of selected elements of an embodiment of a multimedia distribution network.

In one aspect, a disclosed method for controlling a displayed user interface for accessing content provided by a multimedia content delivery network includes recording events associated with a continuous utilization of the user interface by a user, and modifying the displayed user interface for the user based on at least one of the recorded events. The displayed user interface may include menu items arranged according to a modifiable menu layout. The menu items may also be modified. In some embodiments, the method includes generating, during the recording, user information that is accessible by a data warehousing application and mining the user information for business purposes. The method may further comprise analyzing the recorded events to generate user interface utilization statistics. In different embodiments, the recorded events include events that may or may not initiate a selection of content.

In another aspect, a disclosed device includes a processor and memory media accessible to the processor, including processor executable instructions. The instructions may be executable to generate at least a portion of the displayed user interface for accessing content provided by the multimedia content delivery network. The displayed user interface may be displayed to one or more users. Events describing user actions manipulating the displayed user interfaces may be recorded. The events may include transactional and non-transactional user actions. The device may further include executable instructions to modify the displayed user interface based on at least one of the recorded events. The instructions to record the events may include instructions to generate user information and/or event information accessible by a data warehousing application. The device may further include executable instructions to mine the user information for business purposes. In some embodiments, the device further includes executable instructions to analyze the recorded plurality of events to generate user action statistics. In some instances, the user action statistics may be based on recorded events describing user actions manipulating the displayed user interface for a given one of one or more users. In some cases, the user action statistics may be based on a selected subset of the recorded events.

In still another aspect, a disclosed computer-readable memory media includes processor executable instructions for implementing a menu control application. The memory media includes instructions executable to display a user interface for accessing content provided by a multimedia content delivery network, record a plurality of events that continuously log the operation of the user interface by a user, modify the displayed user interface for the user based on at least one of the recorded plurality of events, and mine the recorded plurality of events for business purposes. The displayed user interface may comprise a plurality of menu items arranged according to a menu layout. In some embodiments, the instructions to modify the displayed user interface further comprise instructions to rearrange menu items in the user interface according to a menu layout, insert new menu items in the user interface according to a menu layout, and/or remove menu items from the user interface according to a menu layout. The instructions to record the plurality of events may include instructions to generate information accessible by a data warehousing application, and the instructions to mine the recorded plurality of events may access information from the data warehousing application. The memory media may further include instructions to analyze the recorded plurality of events to generate user interface operation statistics. The memory media may still further include instructions to modify the displayed user interface for the user based on the user interface operation statistics.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of a multimedia content delivery network (MCDN) 100. Although multimedia content is not limited to TV, video on demand (VOD), or pay-per-view programs, the depicted embodiments of MCDN 100 and its capabilities are primarily described herein with reference to these types of multimedia content, which are interchangeably referred to herein as multimedia content, multimedia content program(s), multimedia programs or, simply, programs.

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides connection path(s) between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third part may own and/or operate at least a portion of access network 130.

In IP-compliant embodiments of access network 130, access network 130 may include a physical layer of unshielded twist pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and video-on-demand content.

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., electronic programming guides (EPG), digital video recording (DVR), video on demand (VOD), or pay-per-view programs (PPV), IPTV portal, DRM servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include menu control application 152, which as will be described in detail below, is enabled to monitor and control a user interface displayed to client 120 of MCDN 100.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as user information generated from recording a plurality of events associated with utilization of the user interface by a user, as will be discussed in detail below.

Figure 2:
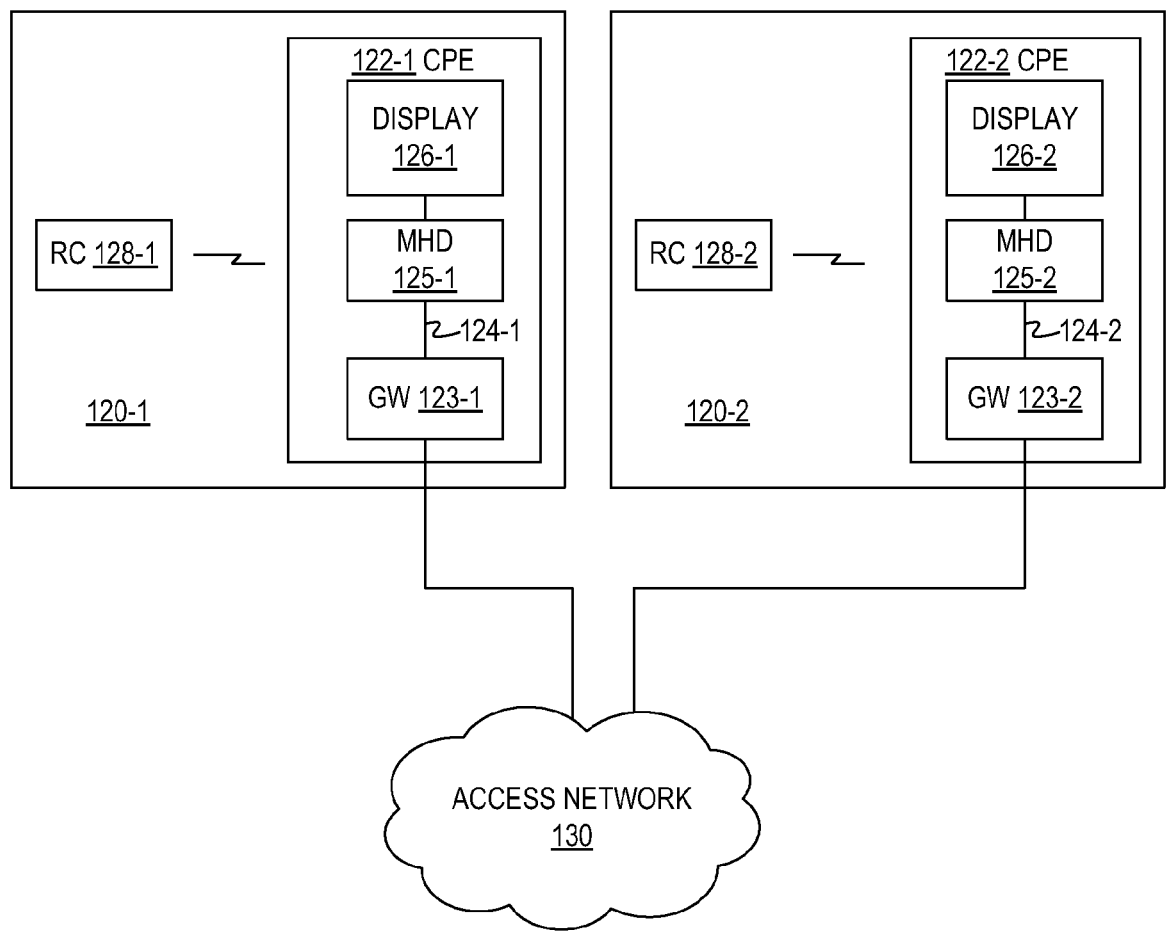

Turning now to FIG. 2, clients 120 are shown in additional detail with respect to access network 130. Clients 120 may include a network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as NTSC (National Television System Committee), PAL (Phase Alternating Line), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

MHD 125 is enabled and configured to process incoming multimedia signals to produce audio and visual signals suitable for delivery to display 126 and any optional external speakers (not depicted). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based multimedia content delivery network.

Figure 3:
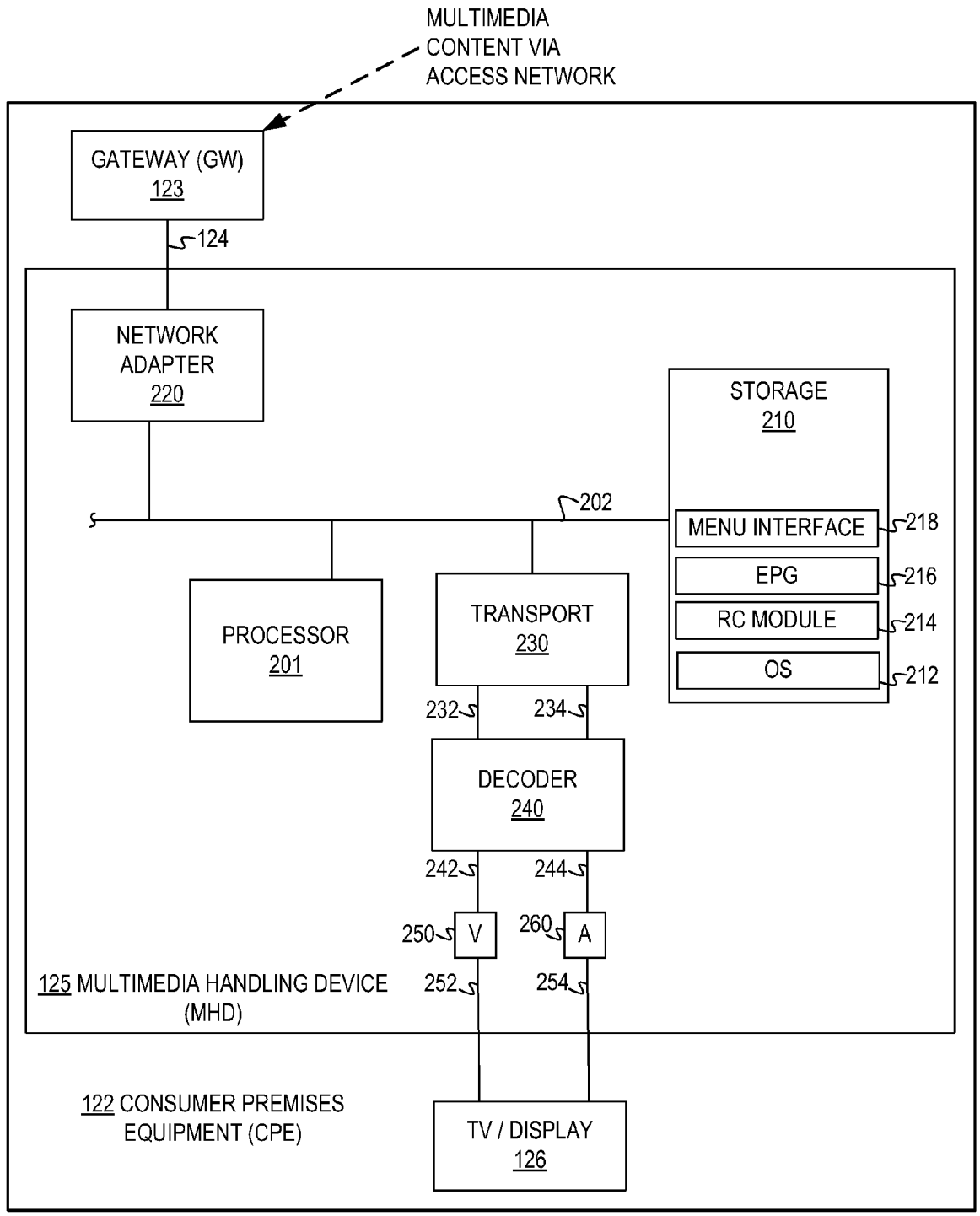
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2.

In the embodiment depicted in FIG. 3, MHD 125 includes processor 201 coupled via shared bus 202 to storage media collectively identified as storage 210. MHD 125, as depicted in FIG. 3, further includes network adapter 220 that interfaces MHD 125 to LAN 124 and through which MHD 125 receives multimedia content.

In embodiments suitable for use in IP based content delivery networks, MHD 125, as depicted in FIG. 3, may include transport unit 230 that assembles the payloads from a sequence or set of network packets into a stream of multimedia content. In coaxial based access networks, content may be delivered as a stream that is not packet based and it may not be necessary in these embodiments to include transport unit 230. In a co-axial implementation, however, clients 120 may require tuning resources (not explicitly depicted in FIG. 1) to "filter" desired content from other content that is delivered over the coaxial medium simultaneously and these tuners may be provided in MHDs 125. The stream of multimedia content received by transport unit 230 may include audio information and video information and transport unit 230 may parse or segregate the two to generate video stream 232 and audio stream 234 as shown.

Video and audio streams 232 and 234, as output from transport unit 230, may include audio or video information that is compressed, encrypted, or both. A decoder unit 240 is shown as receiving video and audio streams 232 and 234 and generating native format video and audio streams 242 and 244. Decoder 240 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 240 may employ any of various audio decoding algorithms including Dolby® Digital, Digital Theatre System (DTS) Coherent Acoustics, and Windows Media Audio (WMA).

The native format video and audio streams 242 and 244 as shown in FIG. 3 may be processed by encoders/digital-to-analog converters (encoders/DACs) 250 and 260 respectively to produce analog video and audio signals 252 and 254 in a format compliant with display 126, which itself may not be a part of MHD 125. Display 126 may comply with NTSC, PAL or any other suitable television standard.

Storage 210 encompasses persistent and volatile media, fixed and removable media, and magnetic and semiconductor media. Storage 210 is operable to store instructions, data, or both. Storage 210 as shown includes sets or sequences of instructions, namely, an operating system 212 and a remote control application program identified as RC module 214. Operating system 212 may be a UNIX or UNIX-like operating system, a Windows® family operating system, or another suitable operating system.

In some embodiments, storage 210 is configured to store and execute instructions provided as services to client 120 by application server 150, as mentioned previously. As shown, in FIG. 3, storage 210 includes electronic programming guide (EPG) 216 and menu interface 218. EPG 216 represents a guide to the multimedia content provided to client 120 via MCDN 100, and may be shown to the user as an element of the user interface. Menu interface 218 may be configured to generate or modify the user interface displayed on display 126. The user interface may include a plurality of menu items arranged according to one or more menu layouts, which enable a user to operate MHD 125. In some embodiments, menu interface 218 tracks events resulting from user actions during operation of the user interface and transmits a log of the tracked events to menu control application 152 (see FIG. 1). In some embodiments, menu control application 152, in conjunction with EPG 216 and menu interface 218, provide functionality to display, record, and control a user interface displayed to client 120 of MCDN 100.

Figure 4:
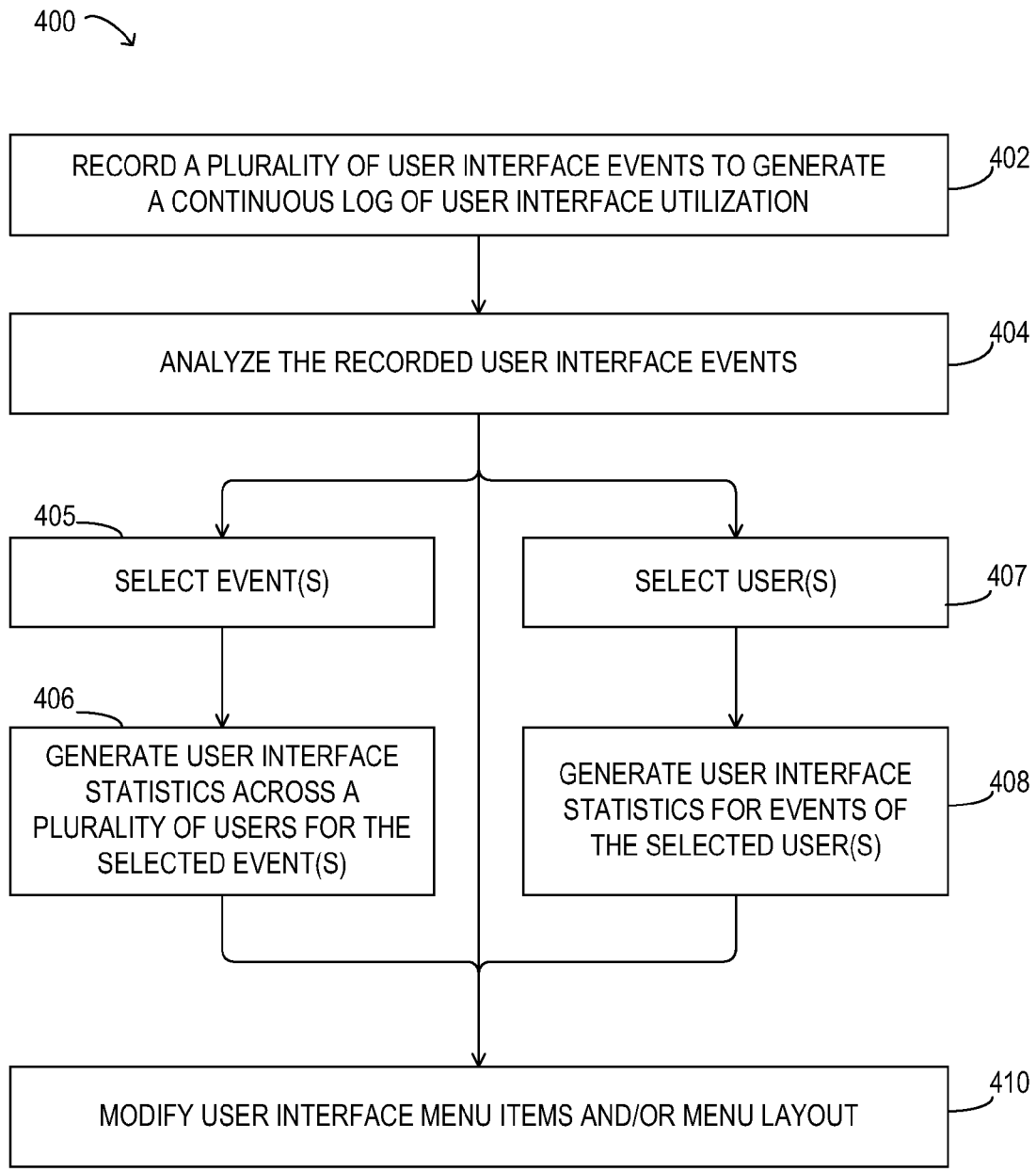
FIG. 4 illustrates an embodiment of a method for controlling a displayed user interface.

Referring now to FIG. 4, one embodiment of a method 400 for controlling a displayed user interface for accessing content provided by MCDN 100 is depicted. Accordingly, method 400 may be executed in a continuous or intermittent manner across a large number of clients 120. It is noted that menu control application 152, alone or in combination with menu interface 218, may be configured to execute method 400. It is further noted that the operations depicted in FIG. 4 may be rearranged, duplicated, or omitted in various embodiments of method 400.

In operation 402, a plurality of user interface events are monitored and logged to generate a continuous log of user interface utilization. It is noted that operation 402 is capable of monitoring (i.e., tracking or recording) user actions, in the form of user interface events, which may otherwise not be detected or recorded by the operational resources of service provider 121. As referred to herein, a comprehensive log of user interface utilization refers to logged data generated by the tracking and recording of substantially every user action performed via the user interface. The logging of the user interface events may be indexed with a global timestamp for each event, along with an identifier for either client 120 or a user associated with client 120. Thus, in some embodiments, operation 402 results in the recording of user interface events for a plurality of end users of MCDN 100. In one embodiment, the log of user interface utilization, i.e., the indexed plurality of user interface events, is recorded using database server 190. It is noted that the recorded plurality of user interface events includes events which cause commands to be issued to MHD 125 or to application server 150, but also includes user interface events whose actions are limited to the selection and display of the user interface on display 126. In other words, user interface events, regardless of whether or not they result in a command or transaction for service provider 121, may be recorded in operation 402.

In operation 404, the recorded user interface events are analyzed. The analysis may involve filtering, selecting subsets, extrapolating, detecting and/or analyzing trends, removing duplicates, or otherwise preparing the logged data for further processing according to desired criteria. In some embodiments, operation 404 results in an analysis report to display a feature of the logged data. In some embodiments, operation 404 generates a result used by operation 410.

After operation 404, method 400 may proceed in one embodiment directly to operation 410. In operation 410, the user interface is modified. The modification performed in operation 410 may include modification of menu items and/or menu layouts of the user interface. The modification to the user interface performed in operation 410 may depend on the results of a previous operation of method 400.

In another embodiment, after operation 404, method 400 proceeds to operation 405, wherein one or more events are selected from the recorded user interface events. In some embodiments, one or more similar events are selected in operation 405. In operation 406, statistics for the user interface across a plurality of users are generated for the event(s) selected in operation 405. Method 400 may proceed to operation 410 from operation 406, such that the statistics generated in operation 406 are used by operation 410 to modify the user interface.

In yet another embodiment, after operation 404, method 400 proceeds to operation 407, wherein one or more users (or client(s) 120) are selected from the plurality of available users (or clients 120). In operation 408, statistics for the user interface are generated for events performed by the user(s) selected in operation 407. Method 400 may proceed to operation 410 from operation 408, such that the statistics generated in operation 408 are used by operation 410 to modify the user interface.

It is noted that in some embodiments of method 400, operations 405 and 406 may be performed in combination with operations 407 and 408, either in parallel or sequentially, prior to performing operation 410.

Figure 5:
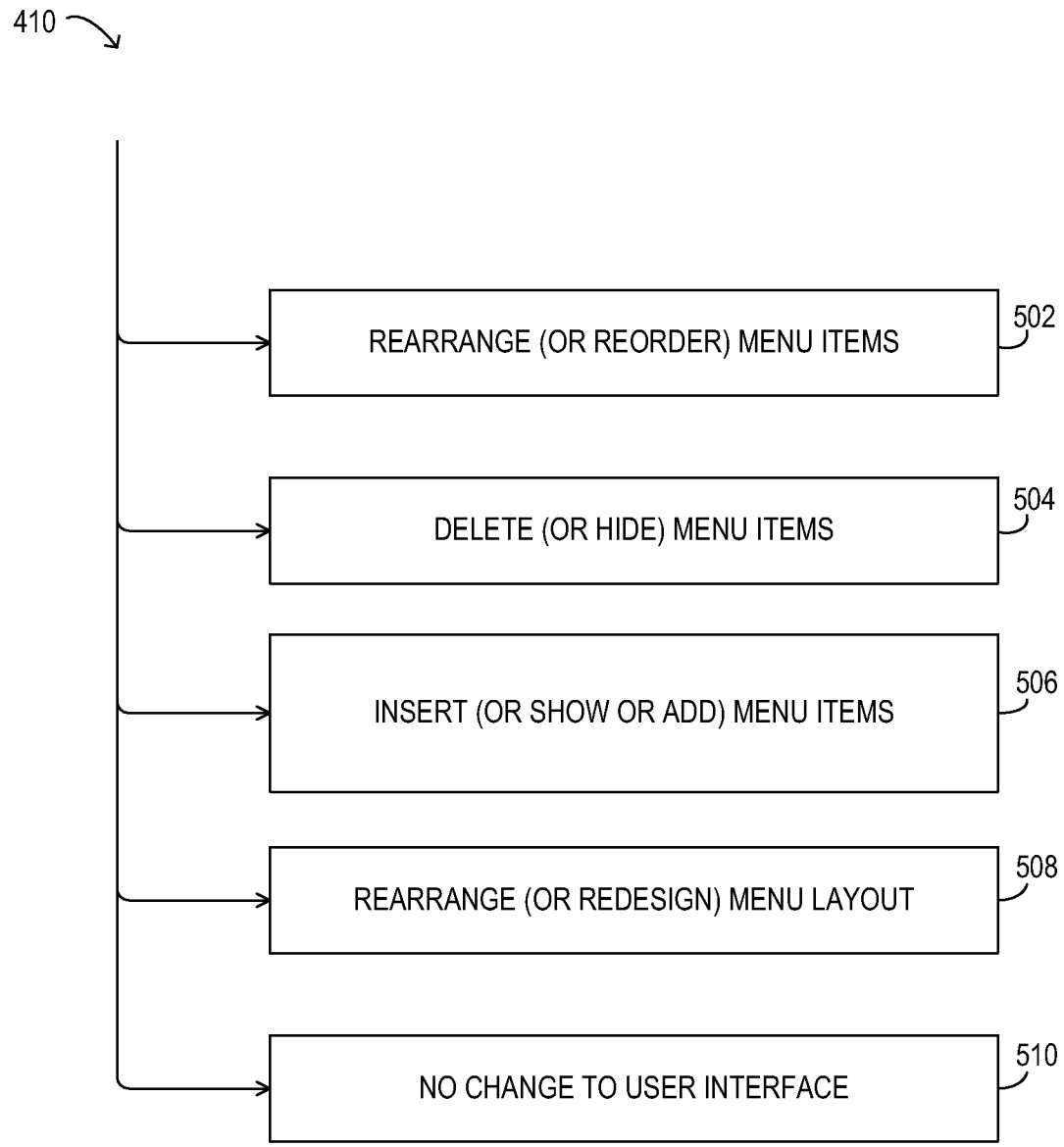
FIG. 5 illustrates an embodiment of a method for modifying a displayed user interface.

Referring now to FIG. 5, one embodiment of operation 410 is depicted in further detail. It is noted that operations 502-510 are exemplary, and may be repeated or omitted in a given implementation of operation 410. As shown in FIG. 5, operation 410 may involve any one or more of operations 502-510. In operation 502, menu items in the user interface are rearranged or reordered. In operation 504, menu items in the user interface are hidden or deleted. In operation 506, menu items in the user interface are inserted, shown, or added. In operation 508, the menu layout, comprising menu items, is rearranged or redesigned. In operation 510, no change to the user interface is performed.

Figure 6:
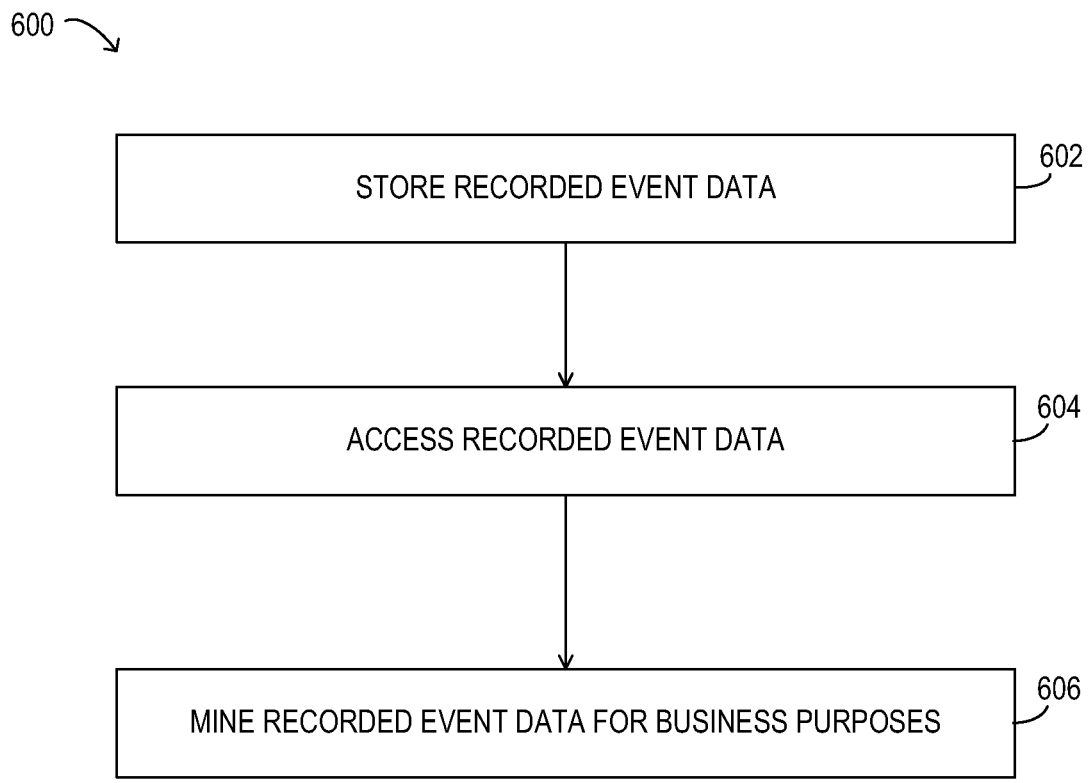
FIG. 6 illustrates an embodiment of a method for accessing a data warehouse.

Referring now to FIG. 6, one embodiment of a method 600 for accessing a data warehouse is depicted. Method 600 may be performed by application server 150 using database server 190 as the data warehouse. In one embodiment, method 600 is performed by menu control application 152. In operation 602, recorded event data are stored in the data warehouse. In some embodiments, operation 602 is performed during operation 402 of method 400 (see FIG. 4), as described above. In operation 604, the recorded event data are accessed. In operation 606, the recorded event data are mined for business purposes. In one embodiment, the mining performed in operation 606 may reveal the viewing habits of subscribers to MCDN 100 and may be used to provide metrics for direct marketing or for business planning. In some embodiments, operation 606 is performed during operation 410 of method 400 (see FIG. 4) for controlling and/or modifying the user interface of one or more subscribers to MCDN 100. It is noted that method 600 may be configured for interactive or conditional execution in an iterative manner. In other embodiments, method 600 is performed automatically, i.e., without further input once initiated.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A user interface method, comprising:
generating filtered event data by filtering event data, indicative of user interface events comprising user interactions, by a plurality of users, with menu items in a user interface, for duplicate event data instances and removing any duplicate event data instances found;
analyzing the filtered event data, wherein analyzing includes:
generating user-independent interface utilization statistics by:
selecting a subset of user interaction types; and
generating user interaction statistics for the subset of user interaction types across the plurality of users; and
generating task-independent interface utilization statistics by:
selecting a subset of users; and
generating user interaction statistics for the subset of users across all user interaction types; and
modifying the user interface based on the user-independent interface utilization statistics and the task-independent interface utilization statistics;
wherein the user interface events include:
user interface interactions that select content provided to the user via a multimedia network; and
user interface interactions that do not select content.

2. The method of claim 1, further comprising:
mining the event data for business purposes.

3. The method of claim 1, wherein modifying the user interface includes modifying an arrangement of menu items in the user interface.

4. The method of claim 1, wherein modifying the user interface includes at least one of:
adding at least one new menu item to the user interface; and
removing at least one menu existing menu item from the user interface.

5. The method of claim 1, further comprising:
generating event data indicative of events which cause commands to be issued to a service provider and events which do not cause commands to be issued to the service provider.

6. The method of claim 5, further comprising:
indexing each item of the event data with: a global timestamp.

7. The method of claim 6, further comprising:
indexing each item of the event data with: a client device identifier.

8. The method of claim 6, further comprising:
indexing each item of the event data with: an identifier of a user associated with a client device.

9. A user interface control system, comprising:
a processor; and
memory media accessible to the processor, including processor executable program instructions, that, when executed by the processor, cause the processor to perform operations including:
generating filtered event data by filtering event data, indicative of user interface events comprising user interactions, by a plurality of users, with menu items in a user interface, for duplicate event data instances and removing any duplicate event data instances found;
analyzing the filtered event data, wherein analyzing includes:
generating user-independent interface utilization statistics by:
selecting a subset of user interaction types; and
generating user interaction statistics for the subset of user interaction types across the plurality of users; and
generating task-independent interface utilization statistics by:
selecting a subset of users; and
generating user interaction statistics for the subset of users across all user interaction types; and
modifying the user interface based on the user-independent interface utilization statistics and the task-independent interface utilization statistics;
wherein the user interface events include:
user interface interactions that select content provided to the user via a multimedia network; and
user interface interactions that do not select content.

10. The system of claim 9, wherein the operations include:
accessing the filtered event data with a data warehousing application.

11. The system of claim 9, wherein modifying the user interface includes at least one of:
adding at least one new menu item to the user interface; and
removing at least one menu existing menu item from the user interface.

12. The system of claim 9, wherein the operations include:
mining the filtered event data for business purposes.

13. The system of claim 9, wherein modifying the user interface includes modifying an arrangement of menu items in the user interface.

14. The system of claim 13, wherein analyzing the filtered event data comprises analyzing the filtered event data periodically.

15. The system of claim 9, wherein analyzing the filtered event data comprises analyzing the event data continuously.

16. A non-transitory computer-readable medium including processor executable instructions that, when executed by a processor, cause the processor to perform operations comprising:
generating filtered event data by filtering event data, indicative of user interface events comprising user interactions, by a plurality of users, with menu items in a user interface, for duplicate event data instances and removing any duplicate event data instances found;
analyzing the filtered event data, wherein analyzing includes:
generating user-independent interface utilization statistics by:
selecting a subset of user interaction types; and
generating user interaction statistics for the subset of user interaction types across the plurality of users; and
generating task-independent interface utilization statistics by:
selecting a subset of users; and
generating user interaction statistics for the subset of users across all user interaction types; and
modifying the user interface based on the user-independent interface utilization statistics and the task-independent interface utilization statistics;
wherein the user interface events include:
user interface interactions that select content provided to the user via a multimedia network; and
user interface interactions that do not select content.

17. The computer readable medium of claim 16, wherein modifying the user interface includes:
inserting new menu items in the user interface.

18. The computer readable medium of claim 16, wherein modifying the user interface includes:
removing menu items from the user interface.

19. The computer readable medium of claim 16, wherein modifying the user interface includes modifying an arrangement of menu items in the user interface.

20. The computer readable medium of claim 16, wherein analyzing the filtered event data comprises analyzing the filtered event data continuously.

21. The computer readable medium of claim 16, wherein analyzing the filtered event data comprises analyzing the filtered event data periodically.

* * * * *